No. 840,730.  
R. F. WENTZ.  
APPARATUS FOR CRUSHING, CONVEYING, AND COOLING ROCKS, ORES, &c.  
APPLICATION FILED AUG. 23, 1899.

PATENTED JAN. 8, 1907.

Witnesses  
Inventor  
Robert F. Wentz.  
By  
Attorneys

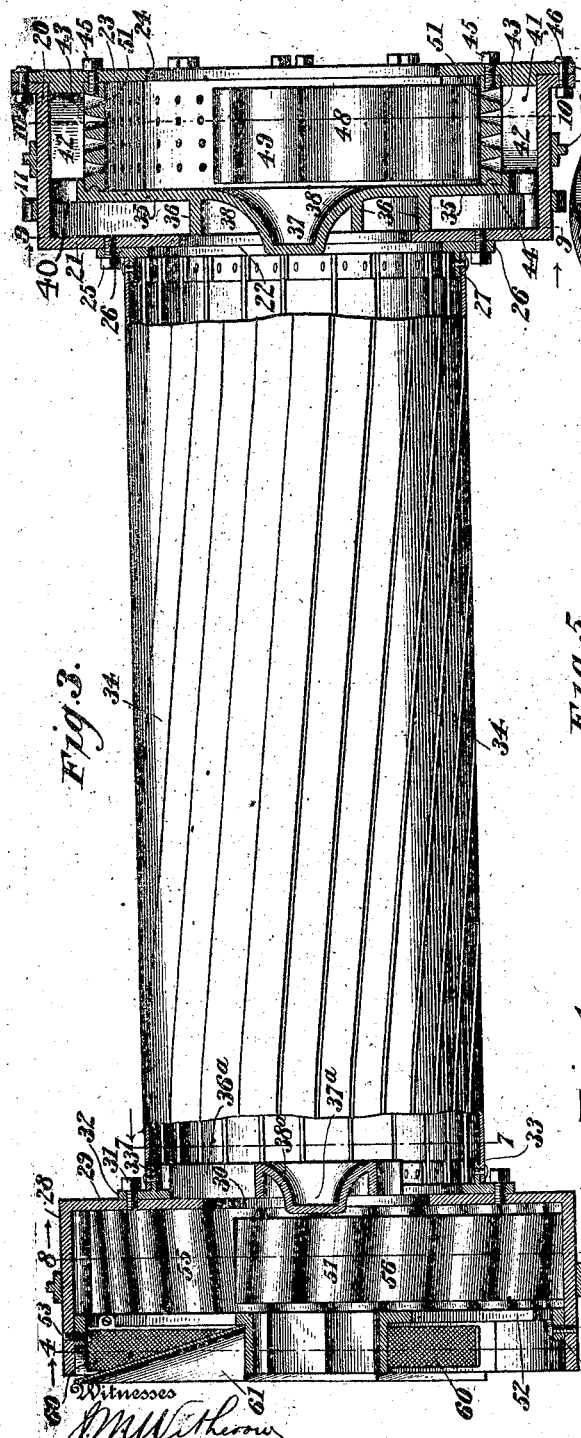

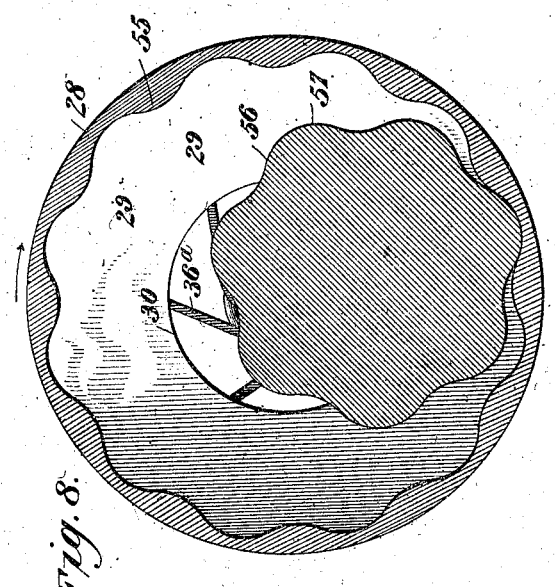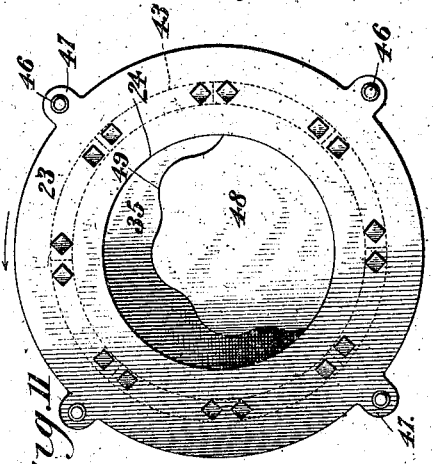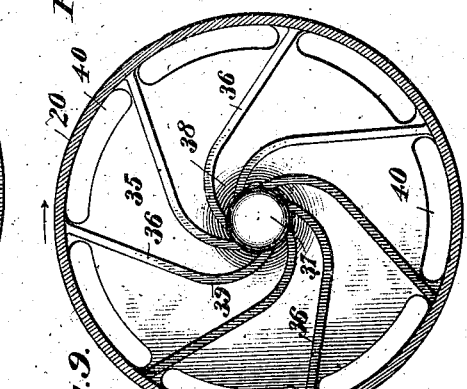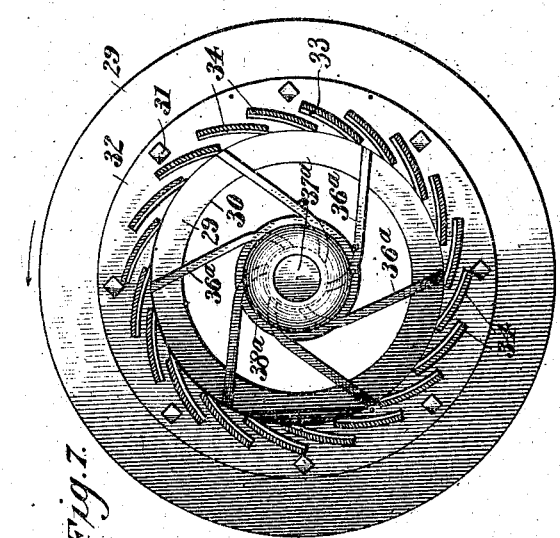

UNITED STATES PATENT OFFICE.

ROBERT FILMORE WENTZ, OF SIEGFRIED, PENNSYLVANIA.

APPARATUS FOR CRUSHING, CONVEYING, AND COOLING ROCKS, ORES, &c.

No. 840,730.

Specification of Letters Patent.

Patented Jan. 8, 1907.

Application filed August 23, 1899. Serial No. 728,228.

*To all whom it may concern:*

Be it known that I, ROBERT FILMORE WENTZ, a citizen of the United States, residing at Siegfried, in the county of Northampton and State of Pennsylvania, have invented a new and useful Apparatus for Crushing, Conveying, and Cooling Rocks, Ores, &c., of which the following is a specification.

My invention relates to certain improvements in apparatus for crushing, conveying, and granulating phosphate rock, pebble, roasted ores, and like substances and cooling the same while in transit through the apparatus, the object being to provide means whereby such operations will be simplified, cheapened, and expedited and all handling of the material from the calciner or roaster will be dispensed with, the heated material to be delivered in the apparatus at one end and discharged in a crushed, ground, cooled, and granulated condition at the opposite end, all the operations to be carried on without the intervention of hand-labor or outside mechanical assistance at any stage.

With these objects in view my invention consists in an apparatus combining two cylindrical heads mounted upon rollers and rotated by suitable mechanism, and a connecting cylindrical conveyer of less diameter than the heads; the head at the entrance end carrying improved crushing devices and a discharger for delivering the material after the first crushing operation to the conveyer-cylinder, and the head at the discharge end carrying devices for further crushing or granulating the material, sieves through which the material is caused to pass, and discharging-blades, the various parts of the apparatus being constructed, arranged, and combined substantially in the manner hereinafter fully described and the specific points of novelty being particularly pointed out in the appended claims.

In order to enable others skilled in the art to which my invention most nearly appertains to make and use the same, I will now proceed to describe its construction and operation, having reference to the accompanying drawings, forming part hereof, in which—

Figure 1 is a view of my improved apparatus in side elevation mounted upon rollers, the rotating or revolving mechanism being also illustrated. Fig. 2 is a transverse vertical section on the plane indicated by the broken line 2 2 in Fig. 1 looking to the left, as indicated by the arrow, the crushing devices being omitted. Fig. 3 is a longitudinal vertical section, the middle portion of the central conveying-cylinder being shown in elevation. Fig. 4 is a transverse vertical section taken on the broken line 4 4 of Fig. 3 looking to the right, as indicated by the arrow. Fig. 5 is a detail view in end elevation of the spider at the delivery end of the apparatus, which forms part of the sifting and discharging mechanism. Fig. 6 is a detail perspective view of the spider shown in Fig. 5 with the sieves and discharging-blades in position thereon. Fig. 7 is a transverse vertical sectional view taken on the plane indicated by the broken line 7 7 of Fig. 3 looking to the left, as indicated by the arrow. Fig. 8 is a similar view on the plane indicated by the broken line 8 8 in Fig. 3 looking in the opposite direction, as indicated by the arrow. Fig. 9 is a similar view on the plane indicated by the broken line 9 9 of Fig. 3 looking to the right, as indicated by the arrow. Fig. 10 is a similar view on the plane indicated by the broken line 10 10 of Fig. 3 looking in the opposite direction, as indicated by the arrow. Fig. 11 is a view in end elevation, on a reduced scale, illustrating the entrance end of the apparatus. Fig. 12 is a fragmentary detail sectional view on the broken line 12 12 of Fig. 2.

Like numerals of reference indicate the same parts in all the figures of the drawings.

Referring to the drawings by numerals, 20 indicates the rim of a hollow cylinder which is cast integrally with the inner head 21 thereof, said inner head being provided with a central opening 22, the outer head 23 being removable and provided with a central opening 24. Rigidly secured to the inner surface of the head 21 by means of bolts 25 is a flat annular ring 26, the diameter of which is somewhat less than that of the head, its central opening being somewhat wider than the central opening 22 of the head 21. Projecting at right angles to the surface of the ring 26 are a number of flanges 27, (counterparts of those marked 33 on Fig. 7,) arranged in a circular series with the outer edge of each overlapping the inner edge of the next, but not in contact therewith, each flange being slightly curved and lying substantially in a line tangential to the inner edge of the ring.

The cylinder just described is located at the entrance end of the apparatus. At the delivery end is a somewhat similar cylinder of which 28 indicates the rim, which is preferably cast integrally with the inner head 29, which is provided with a central opening 30 and to which is secured by bolts 31 a flat ring 32, provided with a circular series of flanges 33 substantially the same as the flanges 27, before described, and arranged in the same order. The two cylinders are connected by a circular series of spirally-arranged strips 34, of metal, which are secured at their opposite ends to the outer surfaces of the flanges 27 and 33, the outer edges of which overlap the inner edge of the next adjacent strip, but not in contact therewith, the whole series of strips forming the cooling and conveying cylinder, which may be of any desired length according to circumstances or the purpose for which the apparatus is used.

35 indicates the diaphragm secured within the rim 20, prevented from sliding toward the inner head 21 by means of series of blades 36, the outer edges of which are in contact with said head. The central portion of the diaphragm 35 is dished inwardly at 37, the center extending a slight distance through the opening 22 of the head 21 and the sides 38 of the dished portion being curved, as shown in Fig. 3. The blades 36 begin at these curved sides of the dished portion of the diaphragm and extend outward, starting on lines tangential to the dished portion 37 and curved for a short distance to points 39, (see Fig. 9,) from whence they extend in straight lines (tangential to a circle whose radius would be equal to the distance from the center of the diaphragm to one of the points 39) to the rim 20. In the outer portion of the diaphragm are formed curved slots or openings 40, adjacent to the inner surface of the rim 20, which connect the spaces between the blades 36 with spaces 41, between the series of spirally-arranged flanges 42, rigidly secured to the inner side of the rim 20 and preferably cast integrally therewith.

43 indicates a ring concentrically located within the head, its outer surface bearing against the inner edges of the flanges 42 and its inner edge against the diaphragm 35, projections 44 on the diaphragm entering recesses in the inner edge of the ring 43 and preventing the ring from turning on the diaphragm. The head 23, before described, is secured to the outer edge of the ring 43 by bolts 45, which pass through the head into the outer edge of the ring, the head being secured to the rim 20 by bolts 46, passing through lugs 47, projecting from the head and rim. The ring 32 and its flanges 33 have inwardly-extending blades or arms 36$^a$, substantially of the form of arms 36, which lead to and terminate in curved sides 38$^a$ of a dished plate 37$^a$ of substantially the form of the corresponding parts 38 and 37 of the diaphragm, the center of the dished plate extending through the opening 30 of cylinder-head 29, as clearly shown at the left of Fig. 3. A crushing-roller 48, provided with corrugated outer surface 49, is mounted to roll upon the inner surface 50 of the ring 43, Fig. 10, the ring being provided throughout its extent with a series of perforations 51, of conical shape, increasing in diameter from the inside to the outside surface of the ring.

Within the rim 28 of the discharge-end crushing-cylinder is secured a spider 52 by means of bolts 53, passing outward through lugs 54 on the spider and threaded into the rim 28. Between this spider and the head 29 the inner surface of the rim 28 is corrugated, as at 55, said corrugations being arranged at a slight angle to the axis of the apparatus to correspond to the corrugated outer surface 56 of a granulating-roller 57, loosely placed therein. The spider 52 is composed of a ring and arms 58, arranged as shown in Figs. 3, 4, 5, and 6, said arms being preferably cast integrally with the ring and extending inward at a slight angle to diameters drawn from the points of junction of the arms and ring, all the arms inclining in the same direction, so that each arm joins the next arm at about one-third the distance from the inner end to the outer end thereof, as at 59. The arms 58 are much wider than the ring 52 and stand at right angles to its face, each arm being provided with an opening in which the sieve 60 is secured in any suitable and well-known manner, and the adjacent arms being connected by curved discharge-blades 61, extending from the inner edge of one arm to the outer edge of the next arm, so as to deflect outward any material which passes through the sieves. The outer edges of the discharge blades or deflectors 61 project slightly beyond the outer end of the rim 28 of the cylinder, so that any material discharged off the blades will fall clear of the cylinder. The circumferential edges of the blades are constructed to lie in the same circular plane as the outer edge of the ring of the spider and the inner surface of that portion of the rim 28 to which the spider is secured.

62 and 63 indicate foundations upon which the apparatus is erected, the upper surfaces thereof consisting of metallic plates 64 and 65, upon which are erected brackets 66 and 67, in which brackets are journaled rollers 68 and 69, upon which the whole apparatus rests, annular flanges 70 and 71 being provided centrally of the rims 20 and 28 to rest upon said rollers. In the center of said plates 64 and 65 are mounted vertical shafts or spindles 72, upon which are journaled rollers 73, which project into side grooves 74, formed in the annular flanges 70 and 71 to steady and guide the apparatus in its rotary movement upon the rollers 68 and 69.

The bracket 67 is extended upwardly and outwardly to form bearings for a shaft 75, upon which is mounted a gear-wheel 76, the teeth of which engage with a circular rack 77, formed on the outside of the rim 20.

The construction of my invention will be understood from the foregoing description, and its operation may be described as follows: The shaft 75 having been set in motion from any suitable power, the rotation of the gear-wheel 76 thereon will cause the whole apparatus to be revolved upon the rollers 68 and 69 in the direction indicated by the several curved arrows at the circumference of the various figures. The material to be crushed, cooled, conveyed, and granulated will be passed into the machine through the opening 24 in the head 23. The rotation of the apparatus will cause the corrugated roller 48 to crush the material over which it rolls and force it through the perforations 51 in the ring 43, the conical shape of said perforations preventing the material from sticking in the perforations. The material thus pressed through the perforations 51 drops into the spaces 41 between the spirally-arranged flanges 42 and slides off these flanges in the direction of the discharge end, passing through the openings 40 in the diaphragm 35. The material is then carried around in the space between the diaphragm 35 and the head 21 until it is raised above the center of the apparatus, when it will drop toward the center and slide off the curved sides 38 of the dished portion of the diaphragm into the cooling and conveying cylinder. As the cylinder rotates the material will drop from the inner edge of each of the strips 34, which compose the cylinder, upon the next succeeding strip, air being taken into the cylinder between the strips 34, thus cooling the contents much more rapidly than would occur in a closed cylinder. Having passed to the end of the cooling-cylinder, the crushed material is carried around by the curved blades 36ª until it is above the center, when it will drop and slide off the curved sides 38ª of the dished plate 37ª into the interior of the rim 28, and upon its interior corrugated surface 55, where it will be granulated or broken into smaller fragments by means of the crushing-roller 57. On account of the inclined position of the corrugations on the interior surface of the rim 28 and the exterior surface of the roller 57, the material will be conveyed along longitudinally of the axis of the apparatus and discharged upon the sieves 60, through which it will pass and drop upon the outer surfaces of the discharge-plate 61, which will deflect the material beyond the end of the apparatus into any machine or receptacle placed to receive it.

From the foregoing description it will be seen that I have provided ample and efficient means for carrying out the objects of my invention, and while I have illustrated and described minutely the construction, arrangement, and combination of the various devices composing the apparatus I desire it to be understood that I do not restrict myself to the exact forms, constructions, arrangements, and combinations shown, but hold that any slight variations therefrom which might suggest themselves to the ordinary mechanic will be properly included within the scope of my invention.

Having thus described my invention, what I claim as new, and desire to secure by Letters Patent of the United States, is—

1. In an apparatus adapted for the crushing of rock, the combination of a rotary cylinder having perforated heads for the feed and discharge of the material, a crushing-cylinder supported within the said revolving cylinder, of a length less than the revolving cylinder and having a perforated periphery, a diaphragm closing the rear end of the chamber formed by the crushing-cylinder, feeding-flanges arranged between the crushing-cylinder and the outer shell of the revolving cylinder, means for directing the crushed material through the opening in the rear head of the revolving cylinder and means for advancing the material through the cylinder, substantially as set forth.

2. In an apparatus adapted for the crushing of rock, the combination of a revolving cylinder, a removable perforated crushing-cylinder arranged therein, means for holding the crushing-cylinder in place in the revolving cylinder and for causing it to turn therewith, means for directing the crushed material out of the crushing-cylinder into the rotary cylinder, and means for advancing it therethrough, substantially as set forth.

3. In a crushing apparatus, the combination of the revolving cylinder provided with a removable head, a diaphragm mounted therein, a removable perforated crushing-cylinder formed with the said diaphragm, and said removable head for its ends, and means for directing the crushed material out of the crushing-cylinder, substantially as set forth.

4. In an apparatus of the described class, the combination of an inclosing rotary cylinder having a series of spirally-arranged interior flanges, a crushing cylinder or ring having a plain interior surface and provided with perforations, and a corrugated crushing-roller loosely placed within the ring or cylinder, the walls of said perforations directing the crushed material from the crushing-cylinder onto said spirally-arranged interior flanges of the rotary cylinder, substantially as set forth.

5. The combination in a rotary cylinder, of a perforated concentric ring mounted therein, a crushing-roller within the ring, spirally-arranged flanges between the ring and the rim of the cylinder, a vertically-arranged diaphragm dished in its center in the direction of the discharge end, and formed with curved blades to direct the material inward, the diaphragm being provided with openings connecting the spaces between the spirally-arranged flanges and the curved blades, substantially as described.

6. In a crushing and cooling apparatus, the combination of two end cylinders each provided with material crushing and feeding mechanism, an intermediate conveyer consisting of a circular series of spirally-arranged slats, the adjacent edges of adjoining slats being so correlated as to maintain communication between the outside air and the interior of the conveyer, while advancing the material to be cooled from one crushing mechanism to the other.

7. In a crushing and cooling apparatus, the combination of mechanism for effecting a relatively coarse crushing of the material to be treated, a second mechanism for effecting a finer reduction of the material as it leaves the first said mechanism, and a rotary spirally-perforated conveying-drum for advancing the material from the first to the second of said mechanisms and for maintaining it in communication with the outside air while traveling between them.

8. In a crushing and cooling apparatus, the combination of rotary mechanism for effecting a relatively coarse crushing of the material to be treated, a second rotary mechanism for effecting a finer reduction of the material to be treated after it leaves the said first mechanism, and a rotary spirally-perforated conveying-drum communicating at either end with one of said crushing mechanisms and adapted to advance material from the one to the other and to maintain it in communication with the outside air during its travel between the said crushing mechanisms.

9. In a crushing mechanism, the combination of a rotary cylinder having internal corrugations longitudinally arranged and at an angle to the axis of rotation of the cylinder, a crushing-roller within the cylinder, free to roll therein and having longitudinal corrugations adapted to register with those of the cylinder as the latter revolves, an axial opening for introducing material into the cylinder, and openings eccentric to the axis of said cylinder for discharging the material therefrom.

10. In a crushing apparatus, the combination with the rim of the discharge-cylinder provided with spirally-arranged corrugations on its inner surface, and a crushing-roller loosely seated therein, and provided with spirally-arranged corrugations on its outer surface to register with those of the rim, of a spider-ring 52 formed with tangentially-arranged arms having openings with sieves secured therein and curved discharge-plates secured between the arms to discharge the material from the machine, substantially as set forth.

11. In a crushing and cooling apparatus, the combination with mechanism for crushing and delivering the material to be treated of a rotary conveying-drum consisting of a circular series of spirally-arranged slats, the adjacent edges of adjoining slats being so correlated as to prevent the escape of material between said slats while maintaining it in communication with the outside air during its travel through the drum.

ROBERT FILMORE WENTZ.

Witnesses:
CLIFFORD D. NEUHARD,
JAMES E. KOCHER.